(12) United States Patent
Lee et al.

(10) Patent No.: US 7,996,767 B2
(45) Date of Patent: *Aug. 9, 2011

(54) SYSTEM AND METHOD FOR GENERATING ELECTRONIC PATENT APPLICATION FILES

(75) Inventors: Chung-I Lee, Taipei Hsien (TW); Hai-Hong Lin, Shenzhen (CN); De-Yi Xie, Shenzhen (CN); Chen-Chen Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1029 days.

This patent is subject to a terminal disclaimer.

(21) Appl. No.: 11/838,240

(22) Filed: Aug. 14, 2007

(65) Prior Publication Data

US 2008/0148143 A1 Jun. 19, 2008

(30) Foreign Application Priority Data

Dec. 13, 2006 (CN) .......................... 2006 1 0157511

(51) Int. Cl.
*G06F 17/00* (2006.01)
(52) U.S. Cl. ...................................................... 715/255
(58) Field of Classification Search .................. 715/200, 715/255
See application file for complete search history.

(56) References Cited

U.S. PATENT DOCUMENTS

| 6,590,589 | B1 * | 7/2003 | Sluiman et al. ............... 715/751 |
| 7,272,616 | B1 * | 9/2007 | McKinnon ............................. 1/1 |
| 7,761,790 | B2 * | 7/2010 | Lee et al. ...................... 715/249 |
| 7,783,614 | B2 * | 8/2010 | Jones et al. ................... 707/694 |
| 2002/0072920 | A1 * | 6/2002 | Grainger ........................... 705/1 |
| 2002/0188638 | A1 * | 12/2002 | Hamscher ..................... 707/530 |
| 2003/0065637 | A1 * | 4/2003 | Glasgow ........................... 707/1 |
| 2003/0097086 | A1 * | 5/2003 | Gura ........................... 604/5.01 |
| 2003/0101416 | A1 | 5/2003 | McInnes et al. |
| 2003/0196173 | A1 * | 10/2003 | Petruzzi ....................... 715/513 |
| 2004/0095588 | A1 * | 5/2004 | Ciccarelli ..................... 358/1.2 |
| 2004/0117739 | A1 * | 6/2004 | Challenger et al. ........... 715/531 |
| 2004/0168129 | A1 * | 8/2004 | Roebuck ....................... 715/530 |
| 2004/0177124 | A1 * | 9/2004 | Hansen ........................ 709/206 |
| 2004/0205622 | A1 * | 10/2004 | Jones et al. ................... 715/523 |
| 2004/0230550 | A1 * | 11/2004 | Simpson et al. ................. 707/1 |
| 2005/0079477 | A1 * | 4/2005 | Diesel et al. .................. 434/350 |
| 2005/0119995 | A1 * | 6/2005 | Lee ................................. 707/3 |
| 2005/0216830 | A1 * | 9/2005 | Turner et al. ................. 715/513 |

(Continued)

OTHER PUBLICATIONS

Chaudhuri et al., An Approach for Recognition and Interpretation of Mathematical Expression in Printed Document, Google 2000, pp. 120-131.*

(Continued)

*Primary Examiner* — Cong-Lac Huynh
(74) *Attorney, Agent, or Firm* — Frank R. Niranjan (57) ABSTRACT

The present invention provides a method for generating electronic patent application files, which includes steps of: creating multiple extensible markup language (XML) templates; setting basic requirements of drafted files; mapping the XML templates to chapter headers in the drafted files; analyzing and verifying whether the drafted files meet the basic requirements; parsing contents of the drafted files into corresponding XML templates if the drafted files meet the basic requirements; and generating XML patent application files according to the XML templates. A related system is also disclosed.

14 Claims, 5 Drawing Sheets

U.S. PATENT DOCUMENTS

| | | | |
|---|---|---|---|
| 2005/0240529 A1* | 10/2005 | Thomas | 705/51 |
| 2006/0010377 A1* | 1/2006 | Anecki et al. | 715/530 |
| 2006/0136824 A1* | 6/2006 | Lin | 715/531 |
| 2006/0161781 A1* | 7/2006 | Rice et al. | 713/176 |
| 2007/0118801 A1* | 5/2007 | Harshbarger et al. | 715/730 |
| 2007/0186156 A1* | 8/2007 | Bagare et al. | 715/523 |
| 2007/0226244 A1* | 9/2007 | Chandrasekharan et al. | 707/102 |
| 2007/0234274 A1* | 10/2007 | Ross et al. | 717/101 |
| 2007/0298389 A1* | 12/2007 | Yu et al. | 434/188 |
| 2008/0270214 A1* | 10/2008 | Eiby et al. | 705/9 |
| 2010/0058498 A1* | 3/2010 | Apuya et al. | 800/298 |

OTHER PUBLICATIONS

Kuhl et al., Instructions for Users of Microsoft Word, Google 2005, pp. 1-6.*

Perrone et al., Instructions for Users of Microsoft Word, Google 2006, pp. 1-7.*

Owens, "Composer Tutorial, Part II", Archived Sep. 29, 2004, pp. 1-8.*

Baru et al., a Data Handling Architecture for a Prototype Federal Application, Google 1998, pp. 397-408.*

* cited by examiner

SYSTEM AND METHOD FOR GENERATING ELECTRONIC PATENT APPLICATION FILES

BACKGROUND OF THE INVENTION

1. Field of the Invention

The present invention relates to a system and method for generating electronic patent application files.

2. Description of Related Art

It is significant for applicants or agencies to file a patent application timely and accurately, for the purpose of protecting inventions effectively. Traditional means of filing the patent application to intellectual property offices include registered posts, certified mails, certified facsimiles, and handing in patent application files, etc. All the above-mentioned means require the applicants to print the patent application files, and then submit the patent application files with paper to the intellectual property offices. Moreover, some intellectual property offices have more requirements on the patent application files. For example, the applicants need to submit two copies of requests, specifications, drawings, and other required files to the SIPO (State Intellectual Property Office of the People's Republic of China, SIPO) for applying Chinese patents. This may waste time and manpower, and may afterwards obtain a latter application/filing date of the patent application. Furthermore, the applicants or the agencies have to wait a period of time before being assigned application numbers.

In recent years, many intellectual property offices provide a new means of filing the patent application files electronically via the Internet by utilizing software programs. The new means saves time and costs, and helps the applicant or the agencies to get the application numbers timely.

However, the new means also has special regulations on electronic patent application files. For example, the electronic patent application files should have a designated format, which is extensible and suitable for the software programs. Generally, the designated format is convenient for the software programs to recognize, but not convenient for attorneys or drafters to draft. In addition, different attorneys/drafters have different work habits to draft the patent application files, which generate different formats of the patent application files.

What is needed, therefore, is a system and method that can provide functions of standardizing the formats and contents of drafted files, and generating electronic patent applicant files that comply with different electronic application regulations of the intellectual property offices.

SUMMARY OF THE INVENTION

A system for generating electronic patent application files is provided. The system includes a file configuration module, a file loading module, a file parsing module, and a file generating module. The file configuration module is configured for creating multiple extensible markup language (XML) templates, for setting basic requirements of drafted files, and for mapping the XML templates to chapter headers in the drafted files. The file loading module is configured for analyzing and verifying whether the drafted files meet the basic requirements. The file parsing module is configured for reading the drafted files, for opening corresponding XML templates when reading the chapter headers in the drafted files, and for parsing contents of the drafted files into corresponding XML templates. The file generating module is configured for generating the patent application files according to the XML templates.

Furthermore, a method for generating electronic patent application files is provided. The method includes the steps of: creating multiple extensible markup language (XML) templates; setting basic requirements of drafted files; mapping the XML templates to chapter headers in the drafted files; analyzing and verifying whether the drafted files meet the basic requirements; parsing contents of the drafted files into corresponding XML templates if the drafted files meet the basic requirements; and generating XML patent application files according to the XML templates.

Other advantages and novel features of the present invention will become more apparent from the following detailed description of preferred embodiments when taken in conjunction with the accompanying drawings.

DETAILED DESCRIPTION OF THE INVENTION

Figure 1:
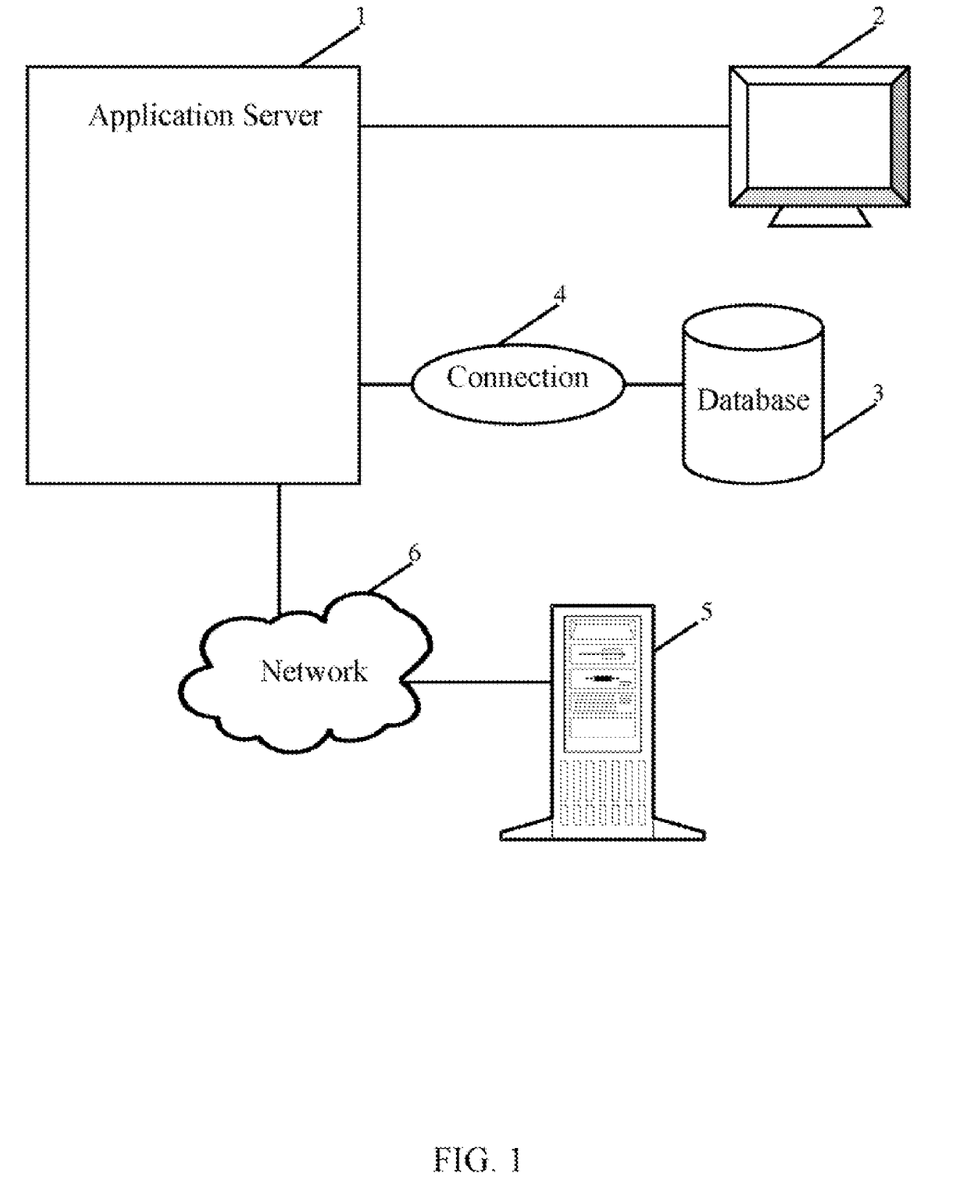
FIG. 1 is a schematic diagram of a hardware configuration of a system for generating electronic patent application files in accordance with a preferred embodiment.

FIG. 1 is a schematic diagram of a hardware configuration of a system for generating electronic patent application files in accordance with a preferred embodiment. The system for generating electronic patent application files (hereinafter, "the system") may include an application server 1, at least one client computer 2, at least one database 3, and at least one Web server 5. The application server 1 is electronically connected with the client computer 2. The client computer 2 may be a common computer, such as a personal computer, a laptop, a portable handheld device, a mobile phone, or other suitable electronic communication terminals. The client computer 2 provides an interactive user interface for inputting patent bibliographical data and uploading related files. The patent bibliographical data may include a patent type, a patent application title, inventors, and other related information.

The application server 1 is further electronically connected with the database 3 via a connection 4. The database 3 is configured (i.e., structured and arranged) for storing various kinds of data, such as the patent bibliographical data, drafted files, and patent application files, etc. The connection 4 is typically a database connectivity, such as an open database connectivity (ODBC) or a Java database connectivity (ODBC).

The application server 1 communicates with the Web server 5 via a network 6, so as to submit patent application files to the intellectual property offices electronically via the network 6. The network 6 may be an intranet, the Internet, or any other suitable type of communication links. Web sites of the intellectual property offices are located on the World Wide Web (WWW) and may be predetermined, such as the United States Patent and Trademark Office (USPTO), the State Intellectual Property Office of the People's Republic of China (SIPO) or any other intellectual property offices.

The system is configured for analyzing and verifying the patent bibliographical data and the drafted files, for parsing the patent bibliographical data and contents of the drafted files, and for generating the patent application files that comply to the electronic application regulations of the intellectual property.

Figure 2:
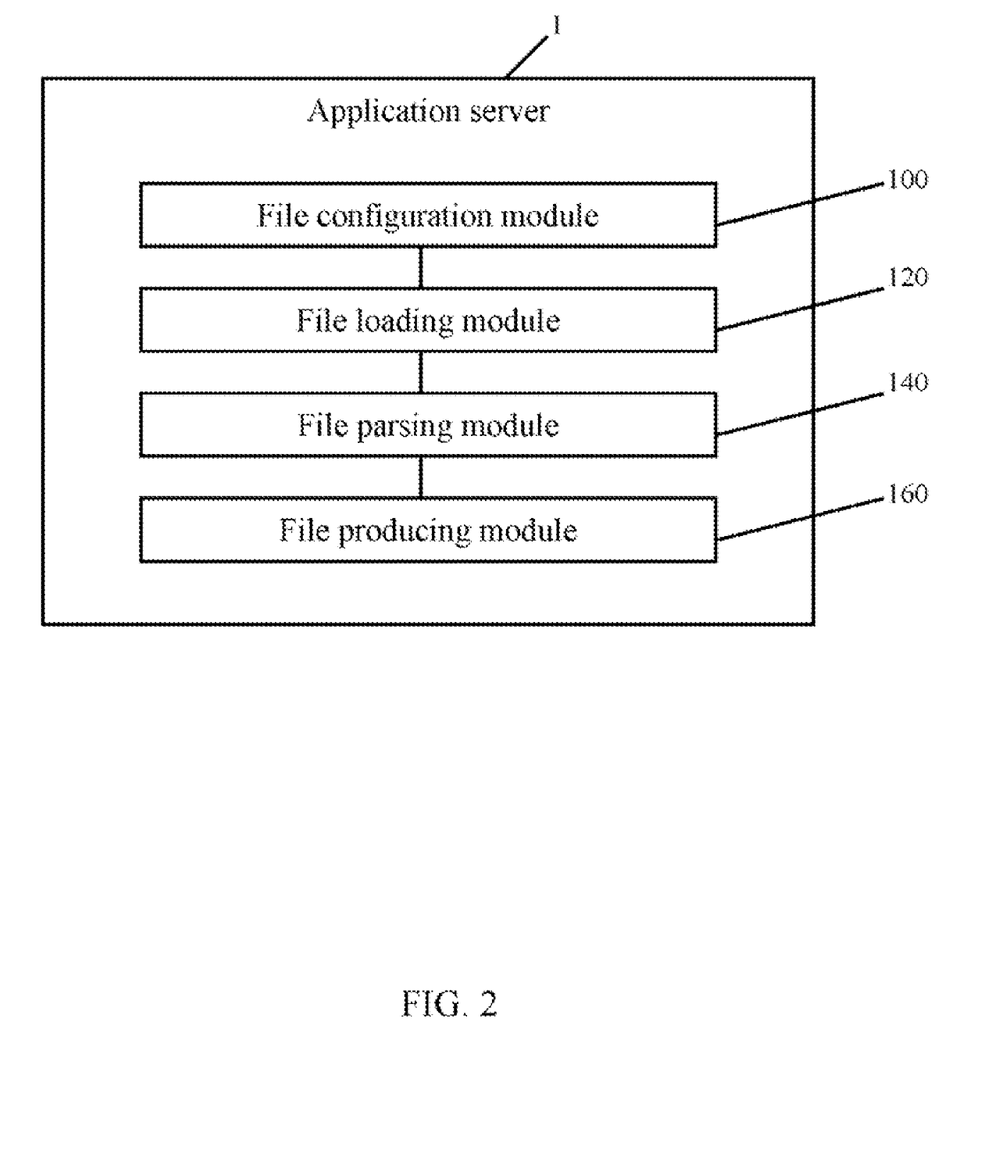
FIG. 2 is a schematic diagram of main software function modules of an application server of FIG. 1.

FIG. 2 is a schematic diagram of main software function modules of the application server 1. The application server 1 may include a file configuration module 100, a file loading module 120, a file parsing module 140, and a file generating module 160.

The file configuration module 100 is configured for creating multiple extensible markup language (XML) templates according to the patent types and the electronic application regulations of the intellectual property offices of different countries. The XML templates are to be inserted with contents parsed from the drafted files so as to generate the patent application files.

For example, there are three patents types in China, these include invention patents, utility model patents, and design patents. Different patent application files need to be prepared/generated to electronically apply for different patent types. Specifically, if the invention patent is to be applied electronically, the patent application files including a request, a description, drawings (if necessary for describing the invention), claims, an abstract, and a copy of the figure of the drawings in the abstract (hereinafter, "the abstract figure") need to be prepared. Thus, a request template, a description template, a drawing template, a claim template, an abstract template, and an abstract figure template would be created by the file configuration module 100. The templates are all in the XML format. In the preferred embodiment, the patent application is an invention patent to be applied electronically at the patent office in China (i.e., SIPO).

The file configuration module 100 is also configured for creating/naming template identifiers corresponding to the XML templates, so as to identify the XML templates. For example, the template identifier of the description template is "Description", the template identifier of the abstract template is "Abstract", and other template identifiers may be "Claims", "Drawing", "Abstract figure", etc.

The file configuration module 100 is further configured for setting basic requirements of the drafted files, and for mapping the XML templates to chapter headers in the drafted files correspondingly. For instance, in regards to the invention patent application in China, the basic requirements include content requirements and format requirements, etc. The content requirements specify that each of the drafted files must have chapter headers at the beginning of each chapter. In the preferred embodiment, the template identifiers correspond to the chapter headers so as to invoke and open corresponding XML templates and insert the contents when the chapter headers are read. The template identifiers may be identical (having the same name) with the chapter headers.

The format requirements specify that formats of the drafted files, specifically requiring the written (textual) contents and drawings are to be put separated into two different files, a word file in the Microsoft Word™ format and a drawing file in the Adobe PDF™ format respectively. That is, the drafted files in the preferred embodiment include the word file and the drawing file.

For example, the contents of the drafted files include an abstract, an abstract figure, claims, a description, and drawings. According to the format requirements, the description, the claims and the abstract need to be put in a Microsoft Word™ formatted word file, and the drawings and the abstract figure need to be put in a Adobe PDF™ formatted drawing file.

The basic requirements may be changed according to the patent types and the electronic application regulations of the intellectual property offices of different countries, such as to edit, add, or delete the basic requirements. The purpose of setting basic requirements is to standardize the drafted files.

The file loading module 120 is configured for receiving the patent bibliographical data and the drafted files from the client computer 2, for storing the patent bibliographical data and the drafted files into the system, and for analyzing and verifying whether the drafted files meet the basic requirements. The patent bibliographical data includes a patent application title, inventors, assignee(s), contact means of the assignee(s), and other related information. The patent bibliographical data is used for generating the request by the file generating module 160. The patent bibliographical data and the drafted files are input/uploaded from the interactive user interface provided by the client computer 2. For instance, the file loading module 120 verifies whether the drafted files are formatted correctly, and whether the drafted files include the chapter headers at the beginning of each chapter. If the drafted files do not meet the basic requirements, the file loading module 120 gives a prompt to update the drafted files and afterwards upload the updated drafted files into the system.

The file loading module 120 is also configured for providing an auto-save function to record data (i.e., the patent bibliographical data) input as previous data input. The auto-save function process the previous data input as selectable items.

The file parsing module 140 is configured for reading the patent bibliographical data and the contents of the drafted files, and for opening corresponding XML templates when reading the chapter headers in the drafted files. As the drafted files include the word file and the drawing file, the file parsing module 140 may read the contents of the word file chapter-by-chapter by identifying the chapter headers, and read the drawings in the drawing file one-by-one.

The file parsing module 140 is further configured for parsing the patent bibliographical data and the contents of the drafted files into corresponding XML templates. Some special objects in the contents are also parsed into the XML templates, such as Microsoft Excel tables, Microsoft equation objects, etc. Detailed parsing steps are described below in relation to FIG. 3 to FIG. 5.

The file generating module 160 is configured for generating the patent application files in the XML format according to the XML templates. The patent application files include the request, the abstract, the abstract figure, the claims, the descriptions, the drawings, and other necessary files. The patent application files comply with the electronic application regulations of the intellectual property office, and are acceptable by the intellectual property office for filing electronically via the network 6. The file generating module 160 is also configured for storing the patent application files into the database 2.

Figure 3:
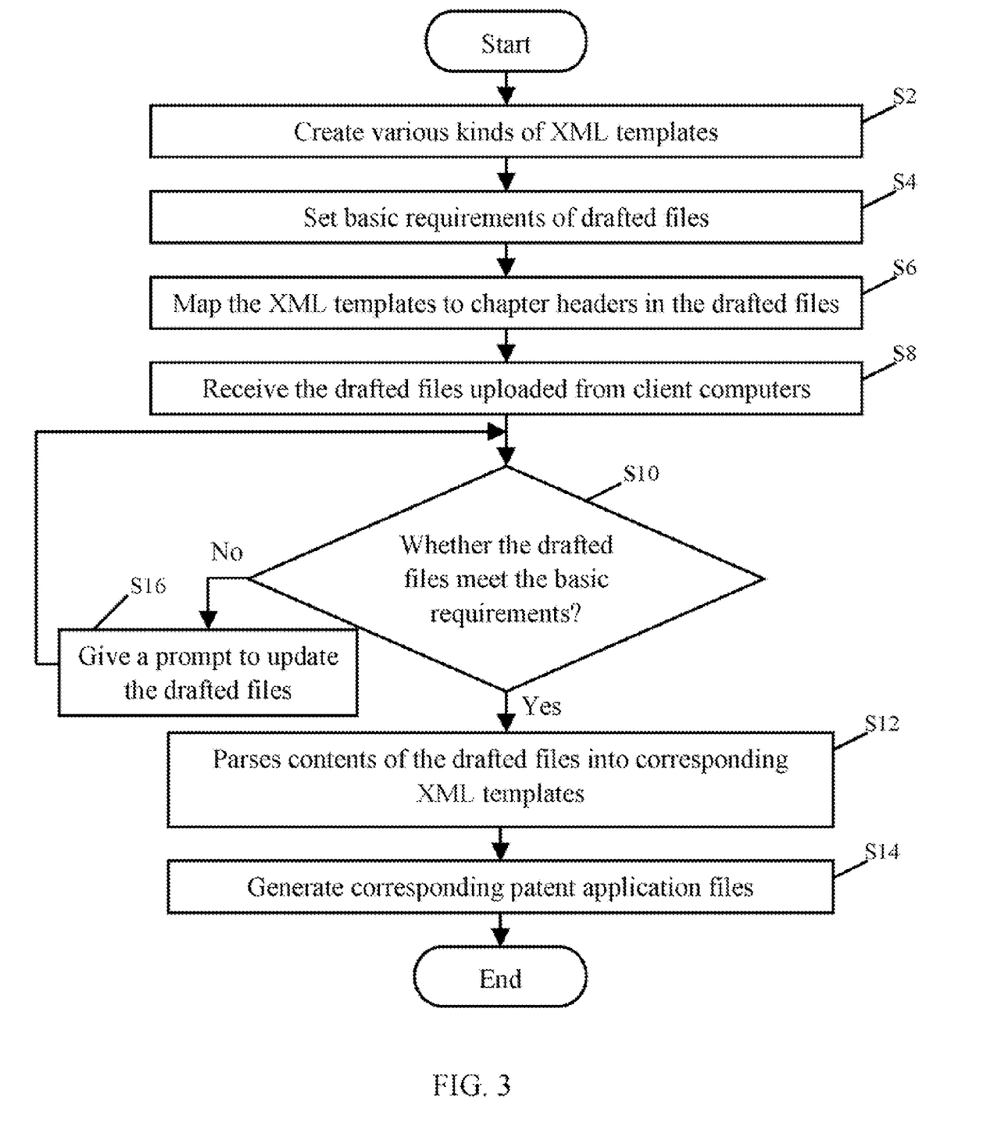
FIG. 3 is a flowchart of a method for generating electronic patent application files.

FIG. 3 is a flowchart of a method for generating electronic patent application files. In step S2, the file configuration module 100 creates various kinds of XML templates according to the patent types and the electronic application regulations of the intellectual property offices of different countries. The XML templates are ready to be inserted with the parsed contents of the drafted files so as to generate the patent application files. Each of the XML templates has a unique template identifier.

In step S4, the file configuration module 100 creates/names the basic requirements of the drafted files. The basic requirements include the content requirements, the format requirements, and other requirements. The basic requirements of the drafted files may be edited, added, or deleted according to the patent types and the electronic application regulations of the intellectual property offices of different countries.

In step S6, the file configuration module 100 maps the XML templates to the chapter headers in the drafted files respectively. The chapter headers may be identical with the template identifiers.

In step S8, the file loading module 120 receives the patent bibliographical data and the drafted files from the client computer 2, and stores the patent bibliographical data and the drafted files into the system. The patent bibliographical data may include the patent application title, the inventors, the assignee(s), and other information.

In step S10, the file loading module 120 analyzes and verifies whether the drafted files meet the basic requirements. For example, the file loading module 120 determines whether the drafted files include corresponding chapter headers and have the correct format. If the drafted files meet the basic requirements, in step S12, the file parsing module 140 parses the patent bibliographical data and the contents of the drafted files into corresponding XML templates (described in detail below in relation to FIG. 4). Otherwise, if the drafted files do not meet the basic requirements, in step S16, the file loading module 120 gives a prompt to update the drafted files and afterwards upload the updated drafted files into the system, and then the procedure returns to step S10.

In step S14, the file generating module 160 generates the patent application files in the XML format according to the XML templates, and stores the patent application files into the database 2. The patent application files comply with the electronic application regulations of the intellectual property office, and are acceptable by the intellectual property office for filing electronically via the network 6.

Generally, step S2 to step S6 are executed in the process of generating the patent application files by utilizing the system for the first time. When generating other patent application files in the same patent type, step S2 to step S6 need not to be repeated except that new XML templates, new template identifiers or basic requirements need to be established, edited or deleted.

Figure 4:
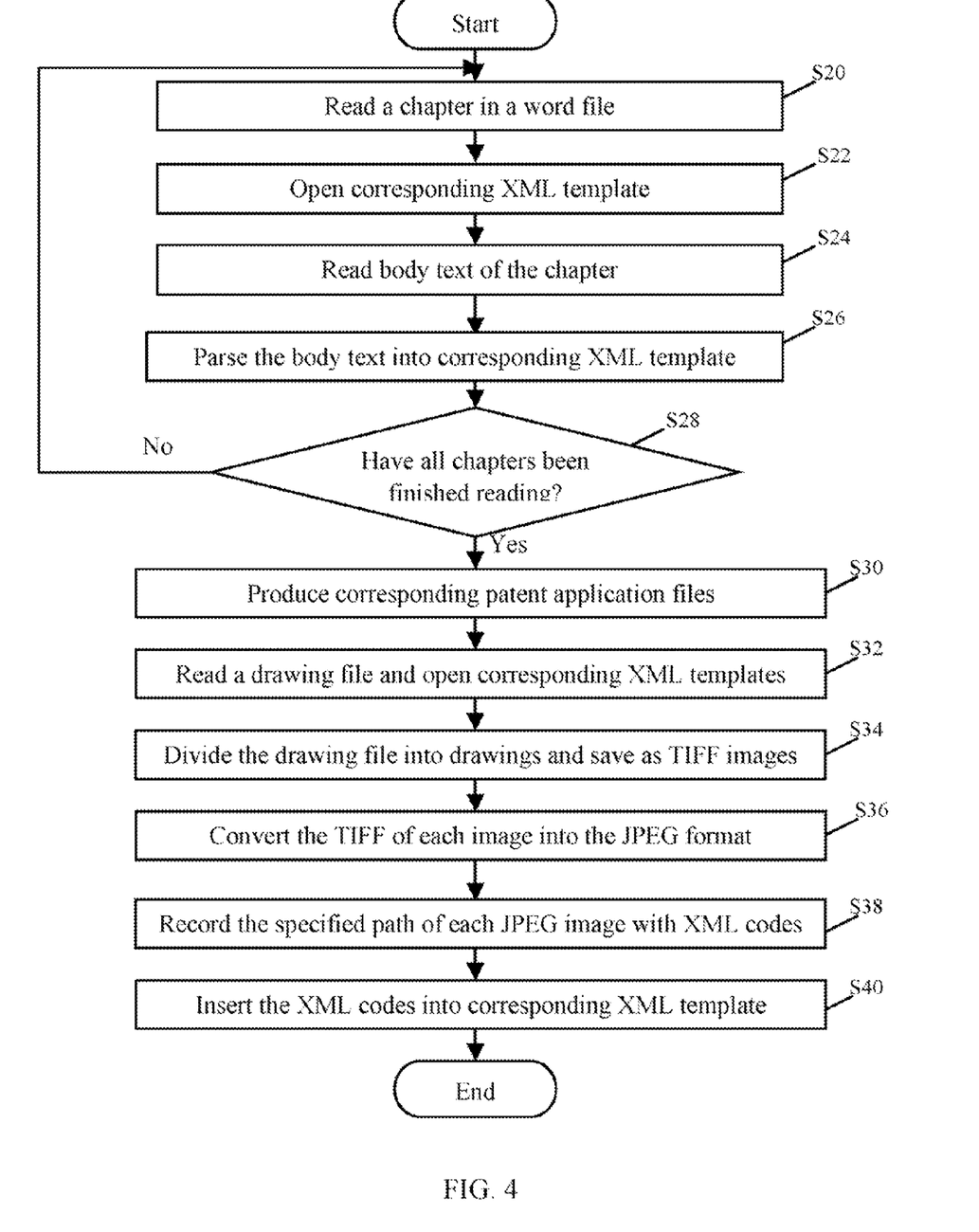
FIG. 4 is a flowchart illustrating one step of FIG. 3 in detail.

FIG. 4 is a flowchart illustrating step S12 of FIG. 3 in detail, namely parsing the contents of the drafted files into corresponding XML templates. In step S20, the file parsing module 140 reads one of the chapters in the word file, which includes the abstract, the claims and the description. In step S22, the file parsing module 140 opens one of the XML templates corresponding to the chapter header of the chapter. For example, the file parsing module 140 opens the claim template when reading the chapter header of "Claims" in the drafted files.

In step S24, the file parsing module 140 reads body text of the chapter.

In step S26, the file parsing module 140 parses the body text of the chapter into the opened XML template. If the chapter includes tables (i.e., the Microsoft Excel tables or tables in other formats) or the Microsoft equation objects, the file parsing module 140 also parses the tables or the Microsoft equation objects into the opened XML template. A process for parsing the table includes the steps of: extracting data in the table; recording the data with XML codes; and inserting the XML codes into the opened XML template. Another process for parsing the Microsoft equation objects is described in detail below in relation to FIG. 5.

In step S28, the file parsing module 140 determines whether all chapters in the word file have been finished reading. If there is one or more chapters have not been read, the procedure returns to step S20, namely reading the next chapter until finishing reading all chapters in the word file.

If all chapters have been read, in step S30, the file generating module 160 generates the patent application files in the XML format according to the XML templates, and stores the patent application files into the database 2.

In step S32, the file parsing module 140 reads the drawing file that includes the drawings and the abstract figure, and opens corresponding XML templates when reading the template identifiers in the drawing file. According to the basic requirements, the drawing file is in the Adobe PDF™ format, and has the chapter headers of "Drawing" and "Abstract figure" for invoking the drawing template and the abstract figure template.

In step S34, the file parsing module 140 divides the drawing file into multiple drawings and saving each drawing as a tagged image file format (TIFF) image. In step S36, the file parsing module 140 converts the TIFF of each image into the joint photographic experts group (JPEG) format, adjusts a definition of each JPEG image, and then saves each JPEG image of the Microsoft equation object at a specified path.

In step S38, the file parsing module 140 records the specified path of each JPEG image with XML codes. For example, the XML codes for recording the specified path may be described as: <image width="40" height="53" src=".\specification_files\S0000.jpg"/>. The "width" and the "height" describes a size of the image, the "specification_files" is a name of a folder for storing the image and means a relative address of the image, and the "S0000" is a name of the image named by the file parsing module 140 automatically.

In step S40, the file parsing module 140 inserts the XML codes into corresponding XML templates, and the file generating module 160 generates corresponding patent application files according to the XML templates.

Figure 5:
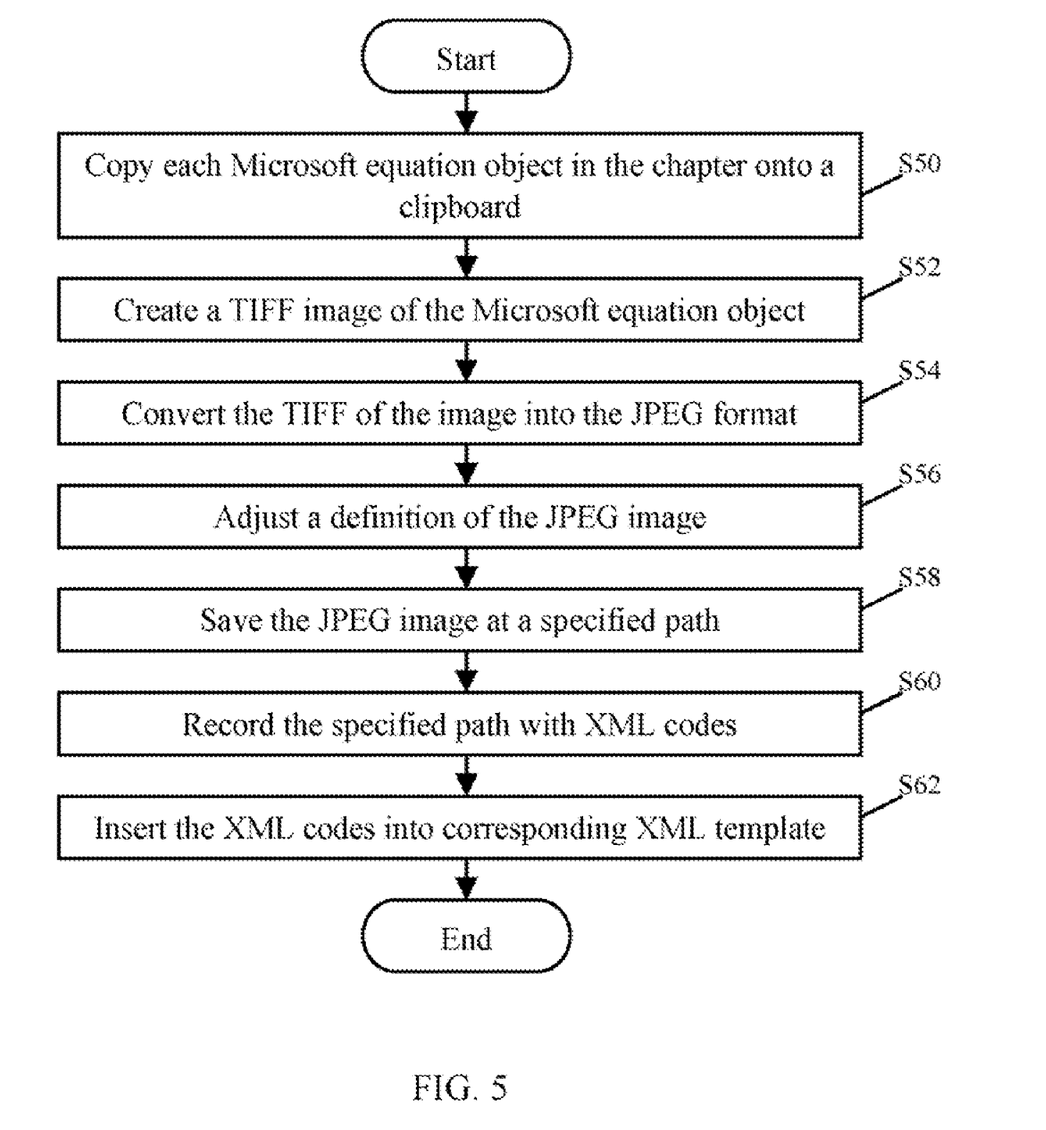
FIG. 5 is a flowchart of a method for parsing Microsoft equation objects into a corresponding XML template.

FIG. 5 is a flowchart of a method for parsing the Microsoft equation objects into the opened XML template. In step S50, the file parsing module 140 copies each Microsoft equation object in the chapter onto a clipboard. In step S52, the file parsing module 140 creates a TIFF image of the Microsoft equation object on the clipboard.

In step S54, the file parsing module 140 converts the TIFF of the image into the JPEG format. In step S56, the file generating module 160 adjusts a definition of the JPEG image. In step S58, the file generating module 160 saves the JPEG image of the Microsoft equation object at a specified path.

In step S60, the file generating module 160 records the specified path of the JPEG image with XML codes. In step S62, the file generating module 160 inserts the XML codes into the opened XML template.

It should be emphasized that the above-described embodiments, particularly, any "preferred" embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:
1. An application server, comprising:
a file configuration module configured for creating multiple extensible markup language (XML) templates, for setting basic requirements of drafted files, and for mapping the XML templates to chapter headers in the drafted files;

a file loading module configured for analyzing and verifying whether the drafted files meet the basic requirements;

a file parsing module configured for reading the drafted files, for opening corresponding XML templates when reading the chapter headers in the drafted files, and for parsing contents of the drafted files into the XML templates, the contents in the drafted files comprising an equation object, the equation object being parsed into the corresponding XML template by copying the equation object in the drafted files onto a clipboard, creating a tagged image file format (TIFF) image of the equation object on the clipboard, converting the TIFF image into a joint photographic experts group (JPEG) image, saving the JPEG image of the equation object at a specified path, recording the specified path of the JPEG image with XML codes, and inserting the XML codes into the corresponding XML template;

a file generating module configured for generating patent application files according to the XML templates; and at least one processor for executing the file configuration module, the file loading module, the file parsing module, and the file generating module.

2. The application server as claimed in claim 1, wherein the file loading module is further configured for receiving the patent bibliographical data and the drafted files, and for storing the patent bibliographical data and the drafted files into the system.

3. The application server as claimed in claim 2, wherein the file parsing module is further configured for parsing the patent bibliographical data into corresponding XML templates.

4. The application server as claimed in claim 1, wherein the file loading module is further configured for giving a prompt to update the drafted files if the drafted files do not meet the basic requirements.

5. The application server as claimed in claim 1, wherein the file configuration module is further configured for editing, adding, and deleting the basic requirements according to requirements of intellectual property offices of different countries.

6. The application server as claimed in claim 1, wherein the file parsing module is further configured for parsing tables into corresponding XML templates.

7. A method for generating electronic patent application files, the method comprising the steps of:

creating multiple extensible markup language (XML) templates;

setting basic requirements of drafted files;

mapping the XML templates to chapter headers in the drafted files;

analyzing and verifying whether the drafted files meet the basic requirements;

parsing contents of the drafted files into corresponding XML templates if the drafted files meet the basic requirements, comprising: parsing an equation object in the drafted files into the corresponding XML template by steps of:

(a) copying the equation object in the drafted files onto a clipboard;

(b) creating a tagged image file format (TIFF) image of the equation object on the clipboard;

(c) converting the TIFF image into a joint photographic experts group (JPEG) image;

(d) saving the JPEG image of the equation object at a specified path;

(e) recording the specified path of the JPEG image with XML codes; and (f) inserting the XML codes into the corresponding XML template; and generating XML patent application files according to the XML templates.

8. The method according to claim 7, further comprising the step of:

giving a prompt to update the drafted files if the drafted files do not meet the basic requirements.

9. The method according to claim 7, further comprising the step of:

inputting patent bibliographical data;

parsing the patent bibliographical data into corresponding XML templates; and generating the XML patent application files according to the XML templates.

10. The method according to claim 7, wherein the parsing step comprises the steps of:

reading a word file and a drawing file within the drafted files;

parsing the word file into corresponding XML templates; and parsing the drawing file into corresponding XML templates.

11. The method according to claim 10, wherein the step of parsing the word file into corresponding XML templates comprises the steps of:

reading a chapter in the word file;

opening one of the XML templates corresponding to a chapter header of the chapter;

reading body text of the chapter; and parsing the body text of the chapter into the opened XML template.

12. The method according to claim 11, wherein the step of parsing the word file into corresponding XML templates further comprises the step of:

parsing tables in the chapter into the opened XML template.

13. The method according to claim 12, wherein the step of parsing tables in the chapter into the opened XML template comprises the steps of:

extracting data in the tables;

recording the data with XML codes; and inserting the XML codes into the opened XML template.

14. The method according to claim 10, wherein the step of parsing the drawing file into corresponding XML templates comprises the steps of:

dividing the drawing file into multiple drawings and saving each drawing as a TIFF image;

converting each of the TIFF image into a JPEG image;

adjusting a definition of each JPEG image;

saving each JPEG image at a specified path;

recording the specified path of each JPEG image with XML codes; and inserting the XML codes into corresponding XML templates.

* * * * *